United States Patent
Zhang et al.

(10) Patent No.: US 11,089,563 B2
(45) Date of Patent: Aug. 10, 2021

(54) 5G-SIGNAL-BASED DOA FINGERPRINT-BASED POSITIONING METHOD

(71) Applicant: SOUTHEAST UNIVERSITY, Nanjing (CN)

(72) Inventors: Zaichen Zhang, Nanjing (CN); Yuechao Li, Nanjing (CN); Liang Wu, Nanjing (CN)

(73) Assignee: SOUTHEAST UNIVERSITY, Nanjing (CN)

(*) Notice: Subject to any disclaimer, the term of this patent is extended or adjusted under 35 U.S.C. 154(b) by 0 days.

(21) Appl. No.: 16/755,595

(22) PCT Filed: Sep. 11, 2018

(86) PCT No.: PCT/CN2018/104919
§ 371 (c)(1),
(2) Date: Apr. 12, 2020

(87) PCT Pub. No.: WO2019/072062
PCT Pub. Date: Apr. 18, 2019

(65) Prior Publication Data
US 2021/0204241 A1  Jul. 1, 2021

(30) Foreign Application Priority Data
Oct. 12, 2017  (CN) .......................... 201710946282.8

(51) Int. Cl.
*H04W 24/00* (2009.01)
*H04W 64/00* (2009.01)
(52) U.S. Cl.
CPC .................................. *H04W 64/00* (2013.01)

(58) Field of Classification Search
CPC ...................................................... H04W 64/00
(Continued)

(56) References Cited

U.S. PATENT DOCUMENTS

2018/0337739 A1\*  11/2018  Petersson ............... H04B 7/086

FOREIGN PATENT DOCUMENTS

| CN | 103199923 A |   | 7/2013 |
| CN | 106941718 A | \* | 7/2017 |

(Continued)

OTHER PUBLICATIONS

Zhiqing Wei, Yadong Zhao, Xinyi Liu, Zhiyong Fegng, DoA-LF: A location Fingerprint Positioning Algorithm With Multimeter-wave, Aug. 2017, IEEE (Year: 2017).\*

(Continued)

*Primary Examiner* — Tanmay K Shah
(74) *Attorney, Agent, or Firm* — Bayramoglu Law Offices LLC

(57) ABSTRACT

A 5G-signal-based DOA fingerprint-based positioning method includes the following steps: dividing an initial area into a number of micro-cells, and estimating angle information of reference points in the divided micro-cells; storing the angle information of the reference point of each micro-cell and position information of the each micro-cell in a fingerprint database, and updating the angle information in the fingerprint database at regular intervals; wherein when there is a target in the initial area, estimating angle information of the target; matching the angle information of the target with the angle information in the fingerprint database to determine a micro-cell where the target is located to obtain position information of the target, so as to locate the target.

5 Claims, 3 Drawing Sheets

(58) Field of Classification Search
USPC .................................................. 455/456.1
See application file for complete search history.

(56) References Cited

FOREIGN PATENT DOCUMENTS

| CN | 106941718 A | 7/2017 |
| CN | 107613559 A | 1/2018 |
| WO | 2017121339 A1 | 7/2017 |

OTHER PUBLICATIONS

Zhiqing Wei, et al., DoA-LF: A Location Fingerprint Positioning Algorithm With Millimeter-Wave, IEEE Access, Nov. 7, 2017, pp. 22678-22688, vol. 5.

* cited by examiner

5G-SIGNAL-BASED DOA FINGERPRINT-BASED POSITIONING METHOD

CROSS REFERENCE TO THE RELATED APPLICATIONS

This application is the national phase entry of International Application No. PCT/CN2018/104919, filed on Sep. 11, 2018, which is based upon and claims priority to Chinese Patent Application No. 201710946282.8, filed on Oct. 12, 2017, the entire contents of which are incorporated herein by reference.

TECHNICAL FIELD

The present disclosure belongs to the field of positioning technologies, and particularly relates to a 5G-signal-based direction of arrival (DOA) fingerprint-based positioning method.

BACKGROUND

Traditional positioning technologies mainly include outdoor positioning and indoor positioning. The outdoor positioning is generally achieved by the global positioning system (GPS) technology, the wireless network sensor positioning technology, the underwater acoustic positioning technology, the radar positioning technology, and the cellular network base station positioning technology. While the indoor positioning is mainly realized by the Wireless-Fidelity (Wi-Fi) indoor positioning technology, the Bluetooth indoor positioning technology, and the ultra-wideband indoor positioning technology. Among the above-mentioned positioning technologies, the GPS significantly improves positioning efficiency and diminishes positioning errors, but the support equipment required by this system is highly expensive. Additionally, other positioning technologies are mainly classified into the received signal strength indication (RSSI)-based positioning method, the time of arrival (TOA)-based positioning method, the time difference of arrival (TDOA)-based positioning method, the direction of arrival (DOA)-based positioning method, and a combination thereof. These positioning technologies, however, have poor positioning results and are even prone to failure in the non-line-of-sight (NLOS) environment.

The existing fingerprint-based positioning methods are mostly based on the RSSI, where, the fingerprint database is constructed according to the difference in signal strengths between different nodes, and then a fingerprint matching algorithm such as the K nearest neighbors (KNN) algorithm is employed for positioning. The RSSI of the reference position needs to be measured point by point, which results in a large amount of manpower and time consumption in the offline fingerprint collection stage, and lowers application efficiency.

The fourth generation (4G) of broadband cellular network technology has been successfully deployed for commercial use, followed by the fifth generation (5G) of wireless communications technologies that will be put into commercial use around 2020. The number of antennas in the base station will be continuously increased, and consequently, the positioning accuracy of the angle-of-arrival-based positioning method will be dramatically improved. However, in a complex environment, especially in the NLOS environment, the angle-of-arrival-based positioning technology still has poor positioning accuracy or is even prone to failure, while the fingerprint-based positioning technology can solve the positioning problem in the NLOS environment.

SUMMARY

The objective of the present disclosure is to solve the shortcomings in the prior art and provide a 5G-signal-based DOA fingerprint-based positioning method.

The technical solution of the present disclosure is as follows. A 5G-signal-based DOA fingerprint-based positioning method, including the following steps:

(1) dividing an initial area into N*N micro-cells of equal size, selecting a center point of each micro-cell as a reference point, and estimating angle information of the reference points in the divided micro-cells;

(2) storing the angle information of the reference point of each micro-cell and position information of the each micro-cell in a fingerprint database, and updating the angle information in the fingerprint database at regular intervals;

(3) when there is a target in the initial area, estimating angle information of the target;

(4) matching the angle information of the target with the angle information in the fingerprint database to determine a micro-cell where the target is located to obtain position information of the target, so as to locate the target.

Further, in step (1), the initial area is first divided into many micro-cells, the reference point is set in each micro-cell, and data received by a base station antenna array is calculated by an estimation of signal parameters via rotational invariant techniques (ESPRIT) to obtain the estimated angle information of the reference point in each micro-cell.

Further, in step (2), the estimated angle information of the reference point and the reference point of each micro-cell respectively correspond to actual position information of each micro-cell; the estimated angle information in the fingerprint database is updated at regular intervals.

Further, in step (3), when the target is in a positioning area, the data received by the base station antenna array is calculated by a multiple signal classification (MUSIC) method or the ESPRIT to estimate the angle information of the target in the positioning area.

Further, step (4) includes: matching the angle information of the target estimated in step (3) with the estimated angle information in the fingerprint database to find best matching estimated angle information in the fingerprint database to obtain a best matching point, so as to locate the target; wherein a micro-cell corresponding to the best matching point is a current position of the target.

Compared with the prior art, the present disclosure has the following advantages.

1. The angle value in the fingerprint database is updated in real time according to the current environment and channel conditions. During positioning, the estimated angle and the angle in the fingerprint database can be matched without considering any channel information. Therefore, this solution can perform accurate positioning in a complex channel environment, and thus has high applicability.

2. In the NLOS environment, traditional positioning solutions cannot function well due to the absence of line-of-sight, while this solution is directed to match the angle of the current target with an available angle in the fingerprint database, and thus can perform accurate positioning in the NLOS environment without identifying the presence of line-of-sight.

3. In this solution, the area is divided into many micro-cells, and the angle match is used to locate the target point in the micro-cell. When the divided micro-cells are small enough, high-precision positioning can be achieved.

In summary, the fingerprint-based positioning of the present disclosure is less susceptible to channel conditions, and can achieve accurate positioning under poor channel conditions and NLOS environments, as well as solve the positioning problem in NLOS environments, which has the advantages of high positioning accuracy and extensive applicability.

DETAILED DESCRIPTION OF THE EMBODIMENTS

The technical solution of the present disclosure will be described in detail hereinafter, but the scope of protection of the present disclosure is not limited to the embodiments.

The traditional positioning technologies are significantly affected by the environment, channel conditions, and the presence or absence of line-of-sight, and have a poor positioning accuracy or are even prone to failure in poor channel conditions and NLOS environments. In contrast, in the present disclosure, an initial area is divided into a number of micro-cells, and the angle information of the reference points in the divided micro-cells is estimated by an algorithm, after that, the angle information of the reference point of each micro-cell and position information of the each micro-cell are stored in the fingerprint database, and the angle information in the fingerprint database is updated at regular intervals; when there is a target in the initial area, the angle information of the target is estimated and matched with the angle information in the fingerprint database to determine a micro-cell where the target is located to obtain the position information of the target, so as to locate the target.

The present disclosure is mainly directed to the 5G DOA fingerprint-based positioning, which is a 5G-base-station-based positioning method. In the present disclosure, massive multiple-input-multiple-output (MIMO) antenna arrays used in 5G are employed to perform a DOA estimation, so as to establish the fingerprint database, which is geared to the needs of mobile terminals such as mobile phones.

Hereinafter, the various steps are illustrated in detail with reference to the drawings and embodiments.

Embodiment 1

Figure 1:
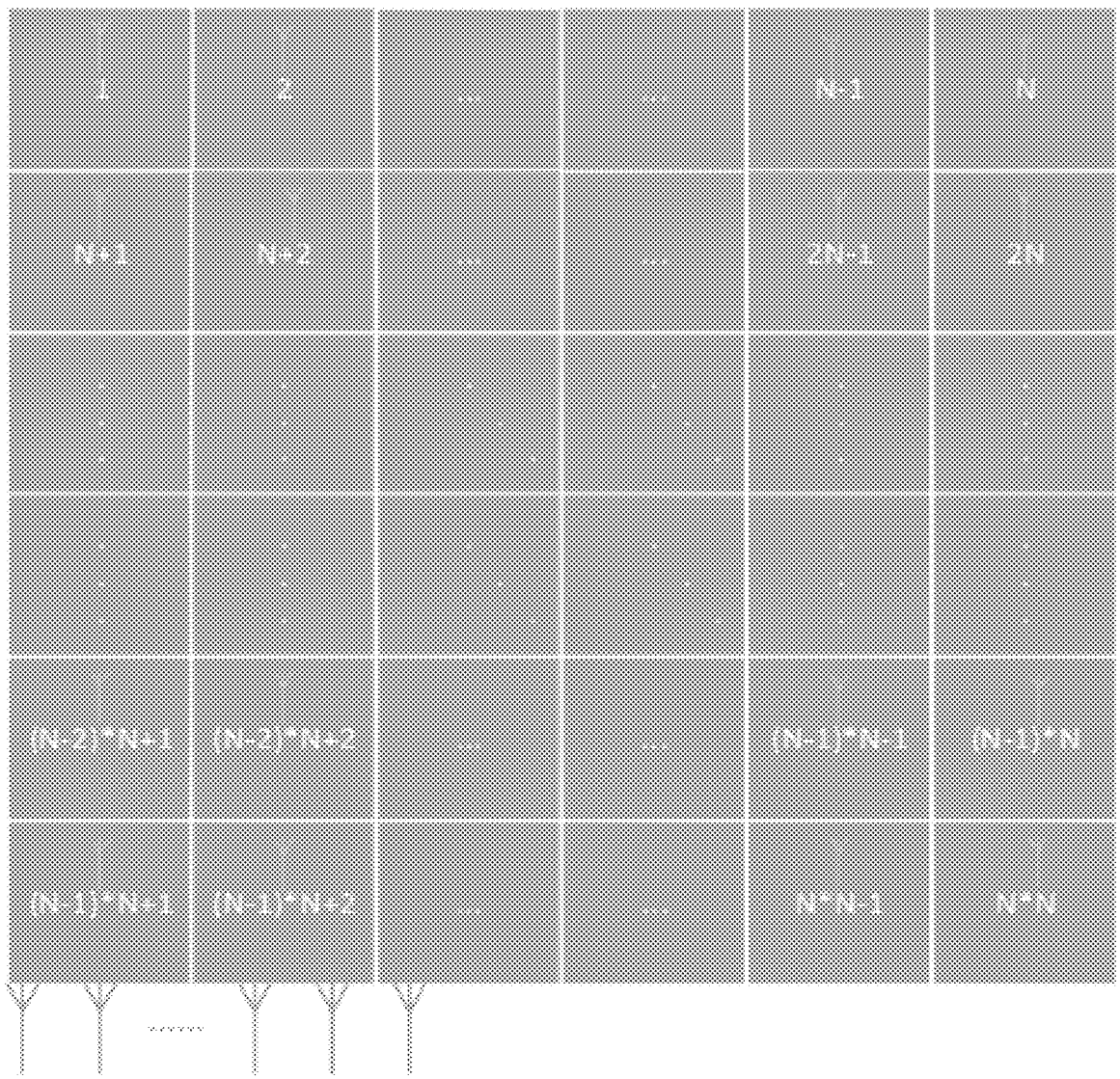
FIG. 1 is a schematic diagram showing the layout of the positioning area of the fingerprint database according to embodiment 1.

(1) In the construction mode of the fingerprint database, first, the area to be located is divided into N×N micro-cells, and a reference point is set in each micro-cell (in practice, the number of reference points can be set as required). Different identification (ID) numbers are assigned to these reference points numbered 1, 2, 3 ..., N×N according to the positions of the reference points, and the reference points with different ID numbers are transmitted at different time points (the time slot interval is greater than the maximum arrival time), as shown in FIG. 1. The position information of each reference point and each micro-cell is entered into the fingerprint database according to the ID numbers.

Figure 2:
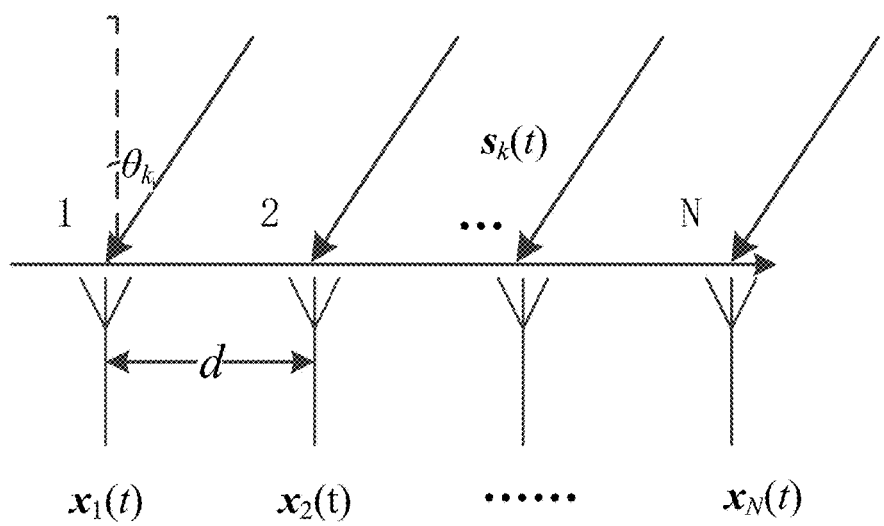
FIG. 2 is a schematic diagram showing the process of receiving signals by the antenna array according to embodiment 1.

(2) At least one set of antenna arrays are arranged at the boundary of the positioning area (one set of antenna arrays are used in the present embodiment) and configured to receive the broadband orthogonal frequency division multiplexing (OFDM) signals transmitted from reference points of the respective micro-cells in sequence. Moreover, the subcarrier signal (narrowband) used for positioning in each signal is processed by the ESPRIT algorithm or MUSIC algorithm to estimate and obtain the angle information of each reference point, as shown in FIG. 2. The reference points respectively correspond to the estimated angles and coordinates according to the time series and numbers, all the estimated angle information is entered into the fingerprint database according to the number of the reference point, and the estimated information in the fingerprint database is updated at regular intervals according to the actual situation.

(3) In the positioning mode, the antenna array processes the positioning subcarrier signals by the ESPRIT algorithm or the MUSIC algorithm after receiving the wideband OFDM signal transmitted by the target to be positioned in the area, to estimate and obtain all the estimated angle information of the target and the corresponding signal strength information.

(4) Finally, correlation matching is performed on the estimated angle information and the angle information in the fingerprint database. There may be multiple estimated angles due to the complexity of the environment, when the correlation matching is performed, different weights a1, a2 ... an are set according to the signal strength information of each angle. The area where the target is located can be determined to locate the target by selecting a reference point with the greatest correlation with the angle of the target through the correlation matching.

Embodiment 2

Figure 3:
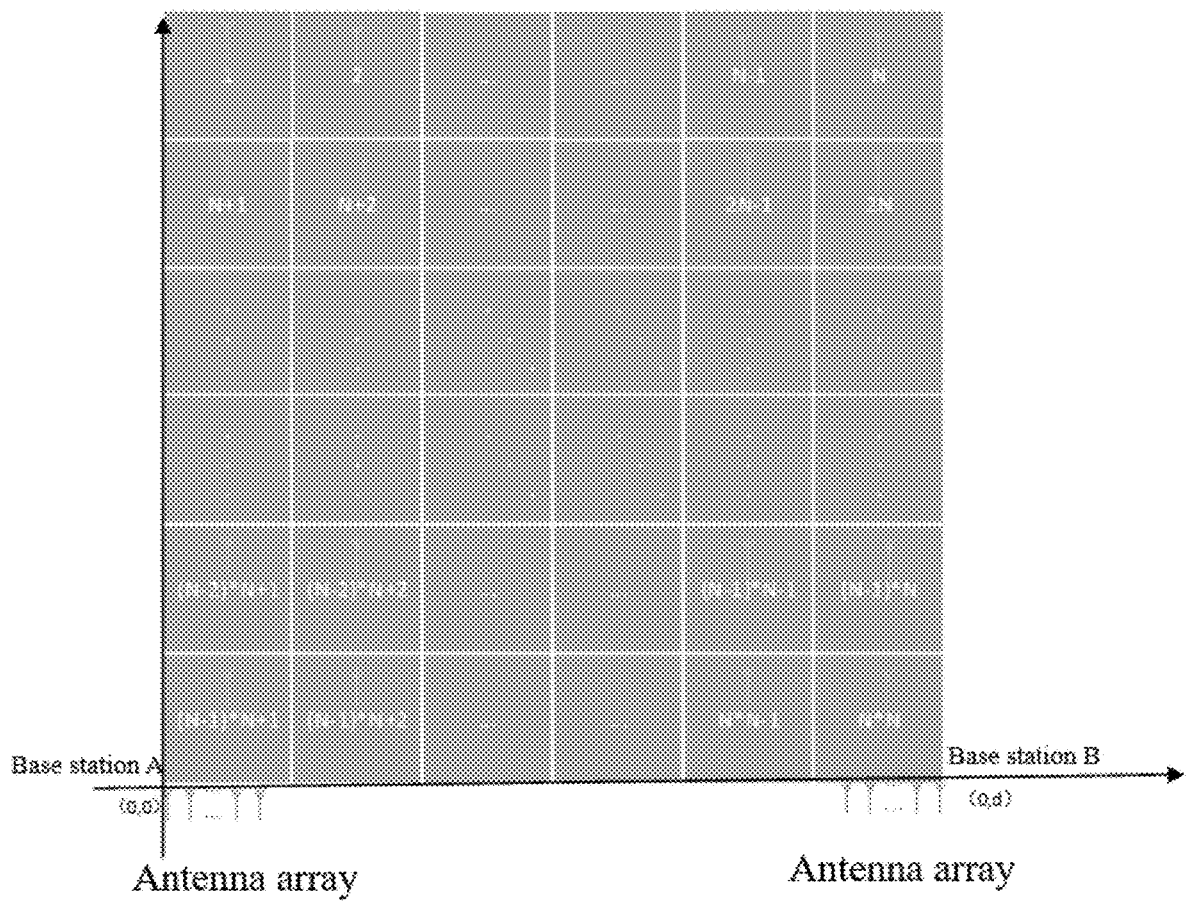
FIG. 3 is a schematic diagram showing the layout of the positioning area of the fingerprint database according to embodiment 2.

(1) In the construction mode of the fingerprint database, first, the area to be located is divided into N×N micro-cells, and a reference point is set in each micro-cell (in practice, the number of reference points can be set as required). Different identification (ID) numbers are assigned to these reference points numbered 1, 2, 3 ..., N×N according to the positions of the reference points, and the reference points with different ID numbers are transmitted at different time points (the time slot interval is greater than the maximum arrival time), as shown in FIG. 3. The position information of each reference point and each micro-cell is entered into the fingerprint database according to the ID numbers.

Figure 4:
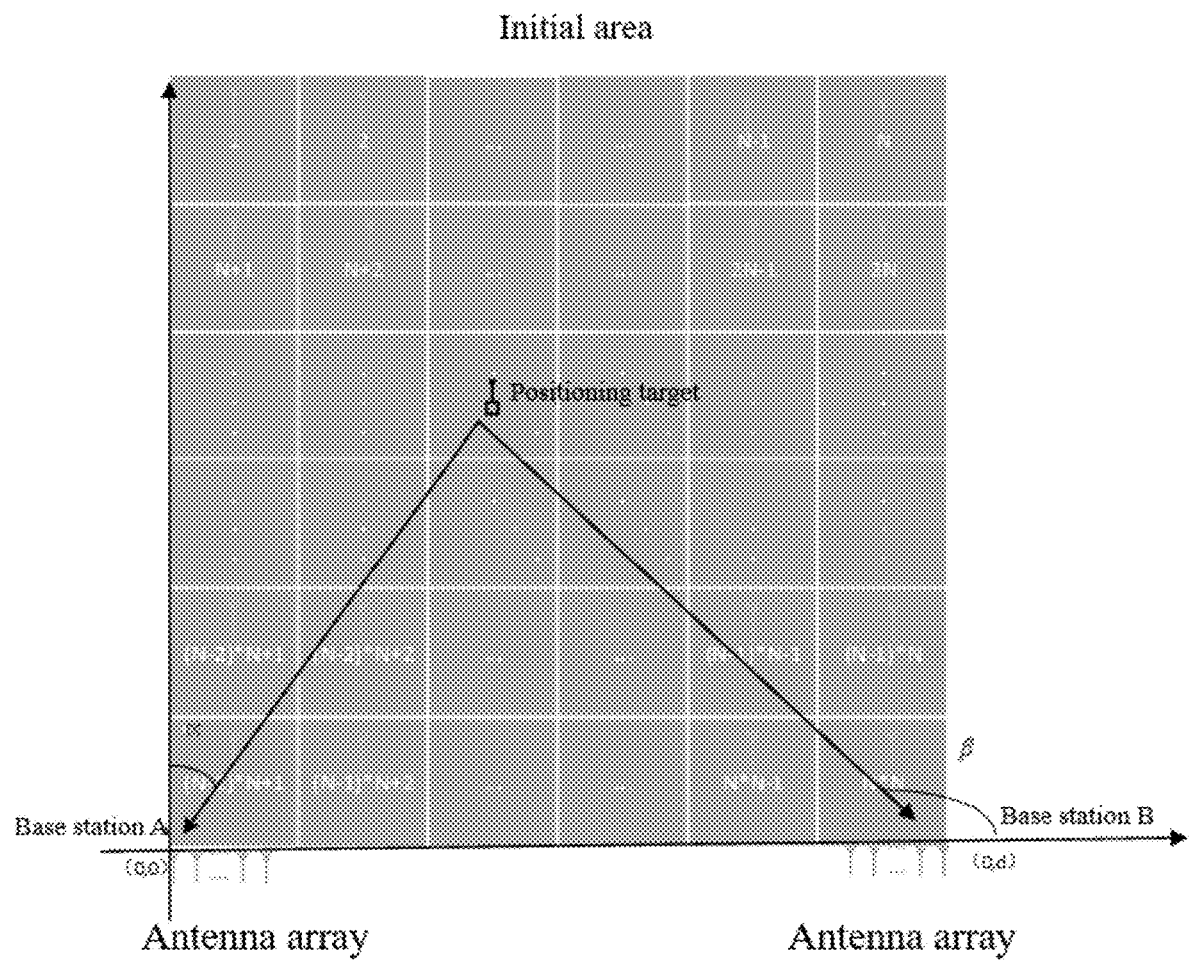
FIG. 4 is a schematic diagram showing the positioning of the target according to embodiment 2.

(2) Two base stations A and B are arranged at the boundary of the positioning area, each of the two base stations is provided with a set of antenna arrays configured to receive the broadband OFDM signals transmitted from reference points of the respective micro-cells in sequence, and the subcarrier signal (narrowband) used for positioning in each signal is processed by the ESPRIT algorithm or MUSIC algorithm to estimate and obtain all the corresponding angle information of each reference point, as shown in FIG. 4.

(3) According to the position information of the base station and the physical information of the positioning area, the coordinates of the positioning point is set as (x, y), the base station A (0, 0) is set as the origin of coordinate, the coordinates of the base station B is set as (0, d), and the distance d between the base station A and the base station B is obtained. The estimated angle of the base station A is $\alpha(\alpha_1, \alpha_2 \ldots, \alpha_{N \times N})$, and the estimated angle of the base station B is $\beta(\beta_1, \beta_2 \ldots, \beta_{N \times N})$. The virtual coordinate information of the point to be positioned can be obtained by solving the following equations.

$$\begin{cases} \dfrac{y}{\tan\beta} + x = d \\ \dfrac{y}{x} = \tan\alpha \end{cases}$$

The reference point is in a one-to-one correspondence with the coordinates according to the number and ID number of the positioning area, all the virtual coordinate information is entered into the fingerprint database, and the estimated information in the fingerprint database is updated at regular intervals according to the actual situation.

(4) In the positioning mode, the antenna array processes the positioning subcarrier signals by the ESPRIT algorithm or the MUSIC algorithm after receiving the wideband OFDM signal transmitted by the target to be positioned in the area, to estimate and obtain all the estimated angle information of the target and the corresponding signal strength information, and the virtual position information of the target is calculated by using the method in step (3).

(5) Finally, correlation matching is performed on the estimated virtual position information and virtual position information in the fingerprint database. There may be multiple virtual coordinates due to the complexity of the environment, when the correlation matching is performed, different weights a1, a2 . . . an are set according to the signal strength information of each virtual coordinate. The area where the target is located can be determined to locate the target by selecting a reference point with the greatest correlation with the virtual coordinate of the target through the correlation matching.

In the present disclosure, the DOA fingerprint-based positioning uses the massive MIMO antenna arrays and algorithms to directly estimate the direction angle of the signal without using the signal strength information (without being affected by the channel environment in the NLOS environment), and the position of the target is accurately calculated to establish the fingerprint database by using the intersection of two or more direction angles.

Figure 5:
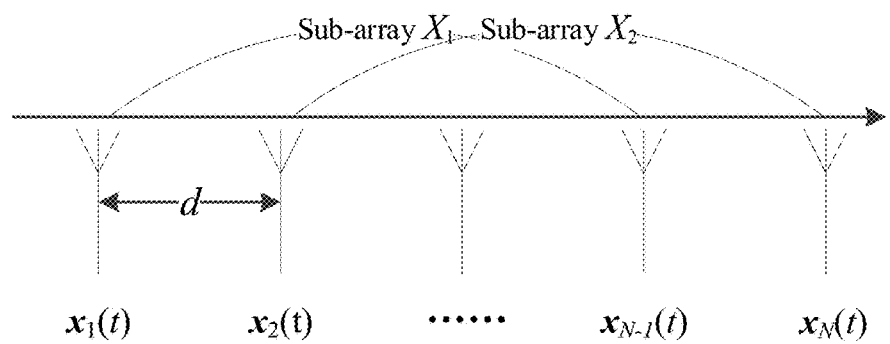
FIG. 5 is a schematic diagram showing the partitioning of sub-arrays of the ESPRIT algorithm.

In the above-mentioned process, the data received by the base station antenna array is calculated by the ESPRIT to obtain all the angle information, and the ESPRIT algorithm is employed to estimate the angle-of-arrival based on the principle of estimation of signal parameters via rotational invariant techniques. FIG. 5 shows the partitioning of the uniform linear array (ULA).

Both the sub-array $X_1$ and the sub-array $X_2$ include N−1 array elements, wherein the sub-array $X_1$ is composed of the first N−1 array elements of the ULA, and the sub-array $X_2$ is composed of the last N−1 array elements of the ULA. The sub-array $X_1$ undergoes a translation to the right by the spacing of one array element to obtain the sub-array $X_2$. The two sub-arrays have translation invariance, the signal subspaces corresponding to the two sub-arrays have rotation invariance, and these relationships are expressed by the following formulas:

$$x_1(t) = Bs(t) + n_1(t) \quad \text{formula (1)}$$
$$x_2(t) = B\Phi s(t) + n_2(t),$$

where, $$B = \begin{bmatrix} \exp(-j\phi_{1,1}) & \exp(-j\phi_{1,2}) & \ldots & \exp(-j\phi_{1,K}) \\ \exp(-j\phi_{2,1}) & \exp(-j\phi_{2,2}) & \ldots & \exp(-j\phi_{2,K}) \\ \vdots & \vdots & & \vdots \\ \exp(-j\phi_{N-1,1}) & \exp(-j\phi_{N-1,2}) & \ldots & \exp(-j\phi_{N-1,K}) \end{bmatrix} \quad \text{formula (2)}$$

$$\Phi = \text{diag}\left\{\exp\left(\frac{-j2\pi d\sin\theta_1}{\lambda}\right), \right. \quad \text{formula (3)}$$
$$\left. \exp\left(\frac{-j2\pi d\sin\theta_2}{\lambda}\right), \ldots, \exp\left(\frac{-j2\pi d\sin\theta_K}{\lambda}\right)\right\}$$

According to the above formulas, the angle-of-arrival information is hidden in the eigenvalue of the matrix $\Phi$, and the eigenvalue of $\Phi$ is obtained to estimate the angle-of-arrival parameter. The following formula can be obtained by rewriting the equation set in formula (1) into matrix form:

$$y(t) = \begin{bmatrix} x_1(t) \\ x_2(t) \end{bmatrix} = \begin{bmatrix} B \\ B\Phi \end{bmatrix} s(t) + \begin{bmatrix} n_1(t) \\ n_2(t) \end{bmatrix} = \overline{B}s(t) + n_y(t) \quad \text{formula (4)}$$

The auto-covariance matrix $R_{yy}$ of the received signal matrix y(t) is derived as follows:

$$R_{yy} = E\{y(t)y^H(t)\} = \overline{B}R_{ss}\overline{B}^H + \sigma_n^2 I = E_s \Lambda_s E_s^H + E_n \Lambda_n E_n^H \quad \text{formula (5)}$$

Since the steering vector B and the signal space are of equal rank, there must be one and only one non-singular transformation matrix T that makes satisfies the formula (5):

$$E_s = \begin{bmatrix} E_1 \\ E_2 \end{bmatrix} = \begin{bmatrix} BT \\ B\Phi T \end{bmatrix} \quad \text{formula (6)}$$

Then, the relationship between matrix $E_1$ and matrix $E_2$ is expressed by the following formula:

$$E_2 = B\Phi T = E_1 T^{-1}\Phi T = E_1 \Psi \quad \text{formula (7)}$$

where, $$\Psi = T^{-1}\Phi T \quad \text{formula (8)}$$

According to the above analysis, matrix $\Psi$ and matrix $\Phi$ have the same eigenvalues, and the following formula can be obtained:

$$\Psi = (E_1^H E_1)^H E_1^H E_2 \quad \text{formula (9)}$$

The signal eigen subspaces $E_1$ and $E_2$ are obtained by the eigenvalue decomposition of the auto-covariance matrix $R_{yy}$, and the eigenvalue decomposition is performed on $\Psi$ obtained by formula (9) to obtain the angle-of-arrival parameter expressed by the following formula:

$$\psi_k = \exp\left(\frac{-j2\pi d\sin\theta_k}{\lambda}\right) \quad (k = 1, 2, \ldots, K) \quad \text{formula (10)}$$

What is claimed is:
1. A 5G-signal-based DOA fingerprint-based positioning method, comprising the following steps:
step (1), dividing an initial area into N*N micro-cells of an equal size, selecting a center point of each micro-cell of the N*N micro-cells as a reference point, and estimating angle information of the reference point in the each micro-cells;

step (2), storing the angle information of the reference point of the micro-cell and position information of the each micro-cell in a fingerprint database, and updating the angle information in the fingerprint database at regular intervals;

step (3), when there is a target in the initial area, estimating angle information of the target; and step (4), matching the angle information of the target with the angle information in the fingerprint database to determine a micro-cell to obtain position information of the target and locate the target, wherein the target is located in the micro-cell, wherein the matching the angle information of the target is performed by a correlational matching on the estimated angle information of the target and the stored angle information of the reference point in the fingerprint database, wherein the correlational matching is performed based on a weight assigned to each angle information of a set of angles of information, wherein the weight is assigned based on a signal strength of each angle information.

2. The 5G-signal-based DOA fingerprint-based positioning method according to claim 1, wherein, in the step (1), data received by a base station antenna array is calculated by a multiple signal classification (MUSIC) method or an estimation of signal parameters via rotational invariant techniques (ESPRIT) to obtain the angle information of the reference point in the each micro-cell.

3. The 5G-signal-based DOA fingerprint-based positioning method according to claim 1, wherein, in step (2), the angle information of the reference point and the reference point of the each micro-cell correspond to actual position information of the each micro-cell; the angle information in the fingerprint database is updated at regular intervals.

4. The 5G-signal-based DOA fingerprint-based positioning method according to claim 1, wherein the step (3), when the target is in the initial area, data received by a base station antenna array is calculated by an ESPRIT to estimate the angle information of the target in the initial area.

5. The 5G-signal-based DOA fingerprint-based positioning method according to claim 1, wherein the step (4), comprises: matching the angle information of the target with the angle information in the fingerprint database to find best matching estimated angle information in the fingerprint database to obtain a best matching point and locate the target; wherein a micro-cell corresponding to the best matching point is a current position of the target.

* * * * *